US 7,653,392 B2

United States Patent
Ovadia et al.

(10) Patent No.: US 7,653,392 B2
(45) Date of Patent: Jan. 26, 2010

(54) METHODS AND SYSTEMS FOR HETEROGENEOUS WIRELESS NETWORK DISCOVERY AND SELECTION

(75) Inventors: Shlomo Ovadia, San Jose, CA (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 11/412,479

(22) Filed: Apr. 26, 2006

(65) Prior Publication Data

US 2007/0253339 A1 Nov. 1, 2007

(51) Int. Cl.
*H04W 4/00* (2009.01)

(52) U.S. Cl. ............... 455/435.2; 455/436; 455/456.2; 370/469; 370/331

(58) Field of Classification Search ............. 455/424, 455/425, 456.5, 456.6, 561, 550.1, 575.1, 455/418, 437, 436, 411, 67.11, 442, 438, 455/439, 452.1, 452.2, 456.2, 509, 515, 516, 455/62, 432.1, 432.3, 435.2, 443–446, 451, 455/454; 370/252, 469, 331, 254, 400, 328, 370/238, 449, 255, 465–467, 329, 333, 338, 370/341, 349; 340/870.1, 870.02, 540, 870.11, 340/572.7, 5.31, 3.51, 539.1; 375/371, 356

See application file for complete search history.

(56) References Cited

U.S. PATENT DOCUMENTS

| | | | |
|---|---|---|---|
| 5,754,945 A * | 5/1998 | Lin et al. ................. 455/436 |
| 6,141,553 A * | 10/2000 | Fernandez et al. ......... 455/436 |
| 6,792,275 B1 * | 9/2004 | Lo et al. ................. 455/452.2 |
| 7,016,651 B1 * | 3/2006 | Narasimhan ............. 455/67.11 |
| 7,408,901 B1 * | 8/2008 | Narayanabhatla .......... 370/331 |
| 2002/0019966 A1 * | 2/2002 | Yagil et al. ................. 714/752 |
| 2003/0157934 A1 * | 8/2003 | Liang .................... 455/436 |
| 2004/0128301 A1 * | 7/2004 | Thint et al. ............... 707/101 |
| 2006/0092872 A1 * | 5/2006 | Lee et al. ................. 370/328 |
| 2006/0092892 A1 * | 5/2006 | Trachewsky .............. 370/338 |

(Continued)

OTHER PUBLICATIONS

P.M.L. Chan, R.E. Sheriff & Y.F. Hu; Month/Year: Dec. 2001; Title-Mobility Management Incorporating Fuzzy Logic for a Heterogeneous IP Environment; IEEE 0163-6804-01, pp. 42-51.*

(Continued)

*Primary Examiner*—Duc Nguyen
*Assistant Examiner*—Charles Chow
(74) *Attorney, Agent, or Firm*—Schwabe, Williamson & Wyatt, P.C.

(57) ABSTRACT

Embodiments of the present invention provide methods and systems for a mobile client device to discover and obtain the parameters of a heterogeneous wireless network via a fuzzy logic operation, within a plurality of heterogeneous wireless networks.

13 Claims, 9 Drawing Sheets

U.S. PATENT DOCUMENTS

| | | | |
|---|---|---|---|
| 2006/0099949 A1* | 5/2006 | Jung et al. | 455/436 |
| 2006/0183479 A1* | 8/2006 | Liu et al. | 455/436 |
| 2006/0187858 A1* | 8/2006 | Kenichi et al. | 370/254 |
| 2006/0221901 A1* | 10/2006 | Yaqub et al. | 370/331 |
| 2006/0268784 A1* | 11/2006 | Lee et al. | 370/331 |
| 2007/0058582 A1* | 3/2007 | Park et al. | 370/329 |
| 2007/0110080 A1* | 5/2007 | Bennett | 370/400 |
| 2007/0115899 A1* | 5/2007 | Ovadia et al. | 370/338 |
| 2007/0149172 A1* | 6/2007 | Dickinson | 455/411 |
| 2007/0167187 A1* | 7/2007 | Rezvani et al. | 455/550.1 |
| 2008/0268844 A1* | 10/2008 | Ma et al. | 455/436 |
| 2008/0298321 A1* | 12/2008 | Lee et al. | 370/331 |
| 2008/0305799 A1* | 12/2008 | Zuniga et al. | 455/437 |
| 2008/0318580 A1* | 12/2008 | Zhong et al. | 455/444 |

OTHER PUBLICATIONS

IEEE 0163-6804-01, Dec. 2001.*

* cited by examiner

METHODS AND SYSTEMS FOR HETEROGENEOUS WIRELESS NETWORK DISCOVERY AND SELECTION

TECHNICAL FIELD

Embodiments of the present invention relate to the field of wireless communication, and more specifically, to methods and systems for wireless network discovery and/or selection.

BACKGROUND

In recent years, network reach and flexibility has been greatly enhanced through the development and deployment of broadband wireless networks. Wireless networks are important for many business operations. Indeed, viable broadband wireless networks are emerging to enable an always-on communication model for mobile platforms and are even providing an alternative to asymmetric digital subscriber lines (ADSLs) and cable modems as the "last mile" network access to the home or office. Additionally, broadband wireless networks are providing network access and network backbone infrastructure in developing areas.

As integrated circuits and wireless networking technology continue to advance, it has become possible for the mobile platforms to host multiple radios enabling them to operate in a Mixed Network (MxN) environment using diverse wireless networks. Successful deployment of such multi-radio mobile platforms requires support of a seamless wireless network service hand-over mechanism to transfer live sessions among heterogeneous wireless networks.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

Figure 1:
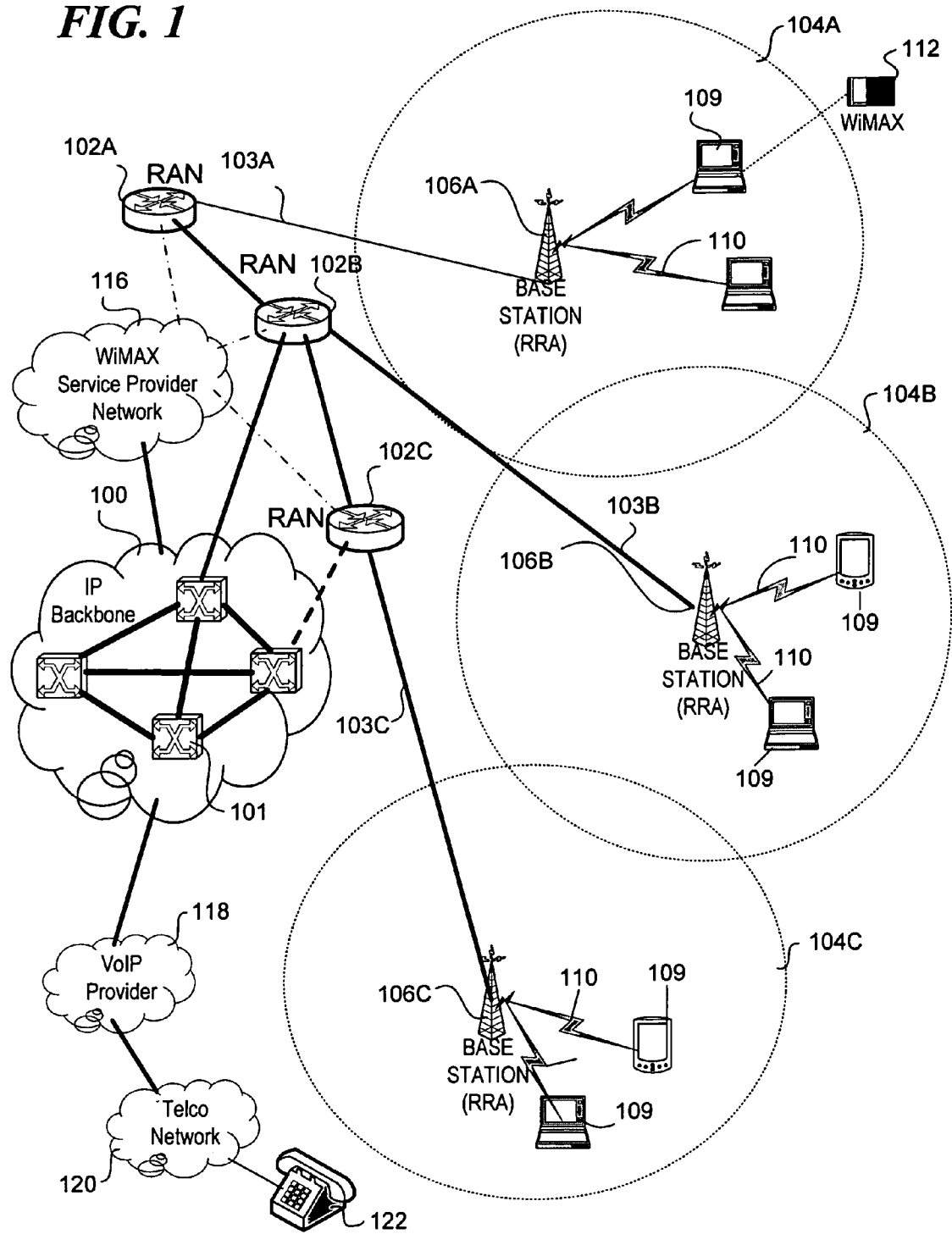
FIG. 1 is a schematic diagram of an exemplary WiMAX network incorporated with the teachings of the invention, in accordance with various embodiments.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and systems for wireless network discovery and selection. The methods and systems described herein are not limited in this regard.

In order to provide a clear and understandable description of the present invention, a brief description of Worldwide Interoperability Microwave Access (WiMAX) and Wireless Fidelity (Wi-Fi) networks is provided below. Additionally, examples of methods and systems for detection and selection of wireless networks are described with reference to Wi-Fi and WiMAX networks. However, it should be understood that similar principles and techniques may be employed for detection and selection of other networks such as, for example, Wireless Personal Area Networks (WPAN), Wireless Local Area Networks (WLAN), Wireless Metropolitan Area Networks (WMAN), Third Generation (3G) cellular networks and Ultra-wideband (UWB) networks. Additionally, although some of the examples are described with respect to standards developed by Institute of Electrical and Electronic Engineers (IEEE), the methods and systems disclosed herein are not so limited, and are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), Ultra-wideband (UWB) Forum, etc.).

FIG. 1 illustrates a simplified exemplary WiMAX broadband wireless network with point-to-multipoint (PMP) cellular-like architecture for operation at both licensed and license-exempt frequency bands typically below 11 GHz, incorporated with the teachings of the invention in accordance with various embodiments. Other types of architectures (not shown) such as mesh broadband wireless networks are permissible. An Internet Protocol (IP) backbone network 100 including multiple network elements 101 (e.g., backbone switches and routers) is connected to a WiMAX broadband wireless network using radio access nodes (RANs), represented by RANs 102A-C. Each RAN is connected via a wired link such as an optical fiber (depicted as optical fiber links 103A, 103B and 103C) or point-to-point wireless link (not shown) to one or more radio cells (depicted between RAN 102A or 102B to radio cells 104A, 104B, and 104C).

At the hub of each radio cell is a respective base station (BS) 106A, 106B, and 106C. A base station includes an advanced antenna system (AAS), which is typically located on top of a radio tower and is used to transmit high-speed data to multiple mobile client devices (MCDs) 109 and receive data from the MCDs via unidirectional wireless links 110. Each MCD 109 accesses network 100 (via an appropriate BS) using the Physical Layer (PHY) and Media Access Control Layer (MAC) features defined by the IEEE P802.16 air-interface standard (2004). As will be described in more detail below, at least selected ones of MCDs 109 are incorporated with the teachings of the present invention for discovering and/or selecting networks. Exemplary MCDs include notebook computers and hand-held wireless devices (e.g., personal digital assistants (PDAs), pocket PCs, cellular phones supporting 802.16 links, etc.)

The coverage areas (cells 104A-C) for respective base stations 106A-C are depicted as circles for simplicity. However, the "footprint" (i.e., shape) of each WiMAX coverage area will generally depend upon the type of antenna (e.g., single sector, multiple sector or omni-directional) provided by the base station in combination with geographical and/or physical infrastructure considerations and the power of the radio signal. For example, although referred to as non-line-of-sight (NLOS), geographical terrain such as mountains and trees, as well as public infrastructure such as large buildings may affect the wireless signal propagation, resulting in a reduced coverage area. The radio signal strength for WiMAX transmissions are also limited by the available RF spectrum for licensed and/or licensed-free operations.

To support station-side operations, each MCD provides an appropriate WiMAX interface, such as depicted by a PCMCIA WiMAX card 112 for a notebook computer. Optionally, the WiMAX wireless interface may be built into the MCD.

Access to a WiMAX network will generally be via some form of subscription service offered by a WiMAX service provider, although some WiMAX services might be provided free of charge, e.g., University campus, city coverage, etc. As such, the various WiMAX RANs 102A-C are depicted as being coupled to and managed by a WiMAX service provider network 116. As will be described in more detail below also, WiMAX service provider network 116 is also incorporated with the teachings of the present invention to support MCD discovery and/or selection of a network. It will be understood that the coupling between a given RAN and WiMAX service provider network 116 may be via a dedicated link (e.g., private trunk or the like), or through another communication means, such as via IP backbone network 100.

Figure 2:
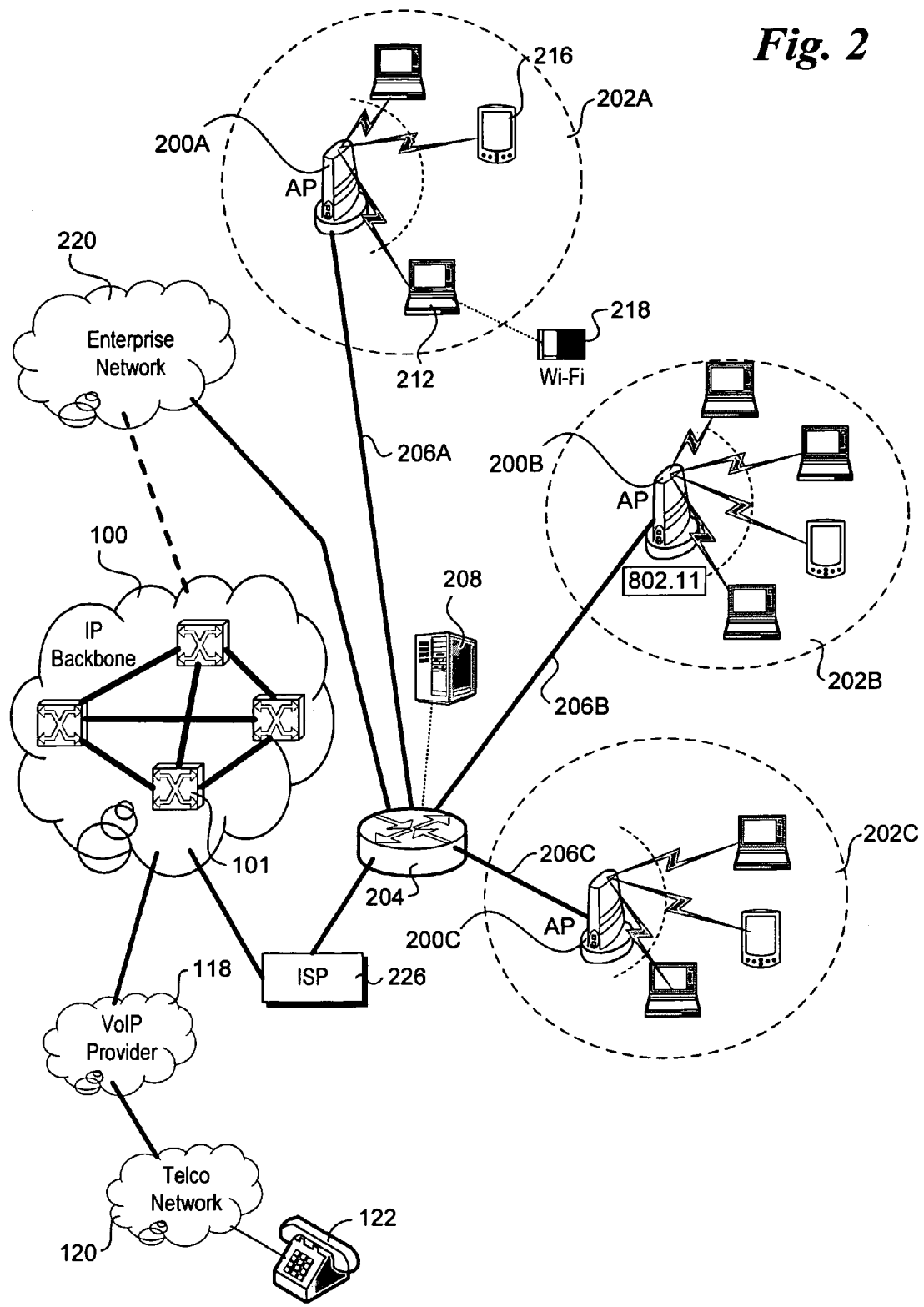
FIG. 2 is a schematic diagram of an exemplary Wi-Fi network incorporated with the teachings of the invention, in accordance with various embodiments.

FIG. 2 illustrates a simplified exemplary Wi-Fi network, wherein each of three access points (APs) 200A, 200B, and 200C provide Wi-Fi connectivity to various Wi-Fi stations within respective coverage areas 202A, 202B, and 202C, and wherein the various Wi-Fi stations are incorporated with the teachings of the present invention, in accordance with various embodiments. Each of wireless APs 200A-C is linked to a switch/router 204 via a respective Ethernet (IEEE 802.3 (2005)) link 206A-C. Alternatively, APs 200A-C may be in wireless communication with a Controller (not shown), where the Controller replaces switch/router 204 and provides Wi-Fi connectivity to the APs, which function as "repeater stations" to provide Wi-Fi connectivity to the various Wi-Fi stations. Such wireless communication may be provided by other APs that replace Ethernet links 206A-C and also serve as "repeater stations."

Each wireless AP 200A-C provides Wi-Fi service to MCDs 109 within its coverage area using wireless signals and protocols defined by the applicable air interface (typically 802.11a, b, and/or g) employed for Wi-Fi networks. (For illustrative purposes, each coverage area is shown in a circular shape, although in practice, the actual shape of a particular coverage area will generally vary based on various obstacles and signal interference from external sources. Additionally, each of coverage areas 202A-C is shown to not overlap any other coverage area. Again, this is for illustrative purposes, as Wi-Fi coverage areas often overlap.) As alluded to earlier, the various MCDs are incorporated with selected embodiments of the network discovery and/or selection technology of the present invention. Exemplary MCDs depicted in FIG. 2 include notebook computers 212 and hand-held wireless devices 216 (e.g., personal digital assistants (PDAs), pocket PCs, cellular phones supporting 802.11 links, etc.). Each MCD includes an appropriate Wi-Fi interface, such as depicted by a PCMCIA Wi-Fi card 218 for a notebook computer. Optionally, the Wi-Fi wireless interface may be built-in, such as is the case with notebooks employing, for example, Intel's Centrino® chipset. Similarly, wireless handheld devices will provide built-in Wi-Fi interfaces.

An AP manages the downlink and uplink traffic for its associated mobile client devices and an upstream network (such as enterprise network 220 and IP backbone 100, as well as traffic originating from other APs) and destined for an MCD served by the AP. Depending upon the particular implementation, Wi-Fi networks are typically connected to IP backbone 100 via an Internet Service Provider (ISP) 226 or facilities provided by a host network, such as enterprise network 220.

Each of FIGS. 1 and 2 further shows network infrastructure for facilitating an exemplary use case in which handover between Wi-Fi and WiMAX networks might be employed. In this example, the use case is using Voice over IP (VoIP), also referred to as Internet Telephony. In brief, VoIP facilities enable phone calls to be carried over Internet infrastructure using a packetized transport. For illustrative purposes, the VoIP facilities depicted in FIGS. 1 and 2 are represented a VoIP provider network 118, a telecommunications (telco) network 120, and a telephone 122 (or other suitable device such as, for example, desktop computer, notebook computer and hand-held wireless devices (e.g., personal digital assistants (PDAs), pocket PCs, cellular phones)).

Figure 3:
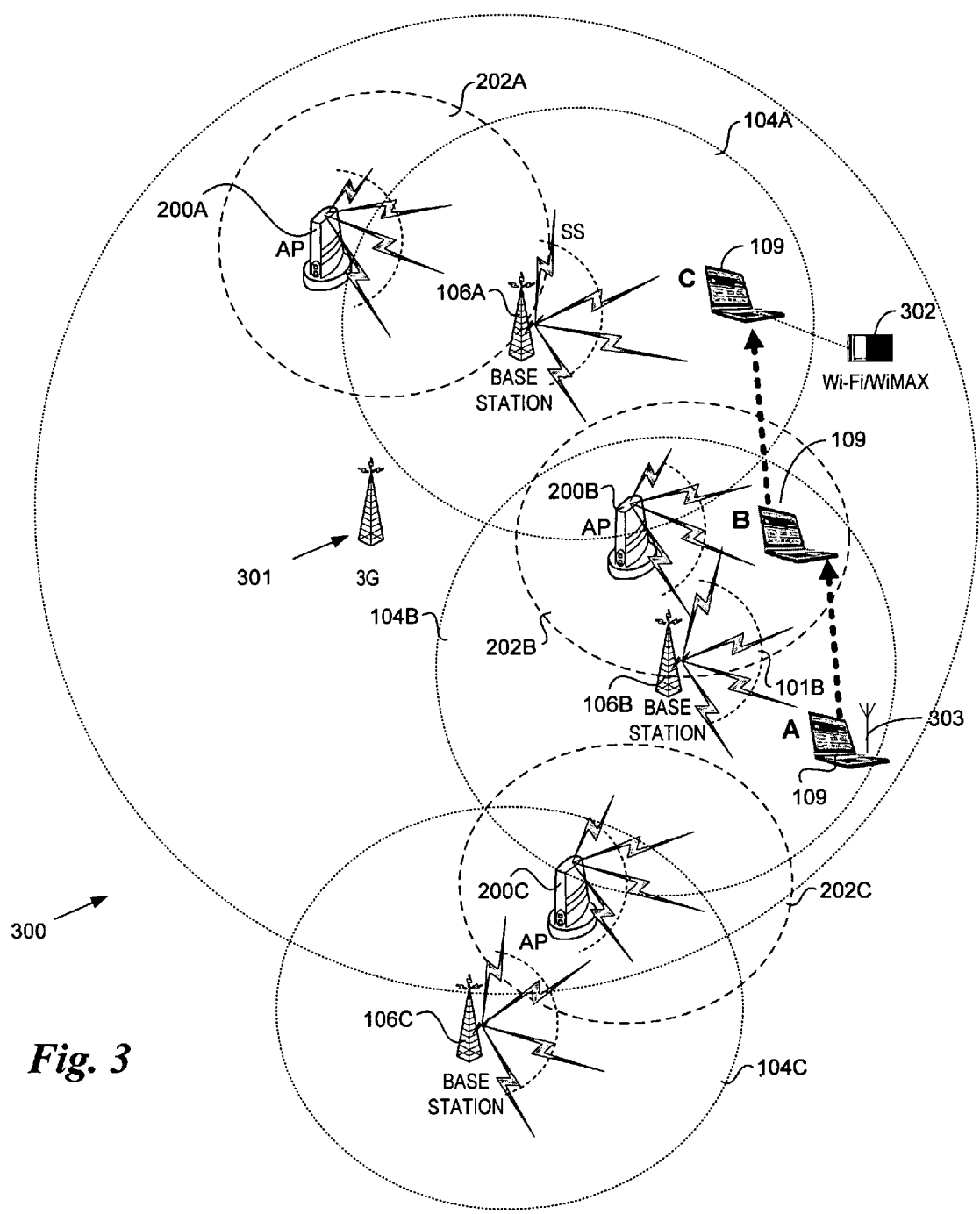
FIG. 3 is a schematic diagram illustrating the coverage areas for the WiMAX and Wi-Fi networks of FIGS. 1 and 2, in accordance with various embodiments.

FIG. 3 illustrates the combined coverage areas of the WiMAX network of FIG. 1 and the Wi-Fi network of FIG. 2 when the networks are overlaid, as well as a 3G network 300, thus providing a Mixed Network (MxN) environment in accordance with various embodiments of the invention. For simplicity, 3G network 300 only has an antenna 301 illustrated, although those skilled in the art will understand that a 3G network will also include base stations. Such base stations may be co-located with the WiMAX base stations 106A-C. As may be seen, there are some portions of coverage areas that overlap, while other portions are non-overlapping. Thus, as an MCD moves through various coverage areas, there will be locations under which the combined network service will provide both Wi-Fi and WiMAX coverage, while in other areas only one type of service (Wi-Fi, WiMAX or 3G) will be available. As such, to support mobile device "roaming," the network services and the MCDs are endowed with the teachings of the present invention to enable the MCDs to switch between Wi-Fi, WiMAX and/or 3G services.

Examples of these situations are illustrated in FIG. 3. At position "A", an MCD 109, incorporated with the teachings of the present invention, is within a single coverage area comprising the WiMAX cell 104B corresponding to Base Station 106B. At position "B", MCD 109 is within two coverage areas: AP 200B's coverage area 202B and Base Station 106B's cell 104B. At position "C", MCD 109 returns to a single coverage area comprising WiMAX cell 104A corresponding to Base Station 106A.

To enable MCD 109 to operate in this combined WiMAX and Wi-Fi network, and be able to take advantage of the most powerful/efficient network available, MCD 109 is provided with wireless networking facilities (i.e., wireless interfaces) for communicating with both WiMAX Base Stations and Wi-Fi access points. For simplicity, such facilities are depicted as being provided by a combination Wi-Fi/WiMAX PCMCIA card 302 in FIG. 3. It should be understood that separate hardware, as well as separate form factors, may be implemented in place of a combination card. Furthermore, it should be understood that there are also software entities that are run on MCD 109 to facilitate Wi-Fi and WiMAX communication. For example, such components will typically include device drivers, an MxN connection manager (CM), or the like.

Because demanding consumers of today need to stay connected anywhere, anytime with ease of use, the increased level of integration, while enabling new capabilities, also raises the level of complexity a user is confronted with in putting these capabilities to work. The CM addresses some of the problems by allowing users or the platform itself based on users' policies to control and use LAN, WLAN and WWAN connection from one unified integrated location, specifically, the communication dashboard. The CM technology allows the platform to detect, select and use their preferred available network through policy based connection selection. The CM helps the user in dealing with the complexity to enjoy a simplified enriched computing and seamless communications experience. The CM provides the experience of simple and seamless connectivity to users. It also supports functionality that the users frequently use on a daily basis. The remaining media specific configuration and advanced use cases are by Connection Utility (CU) software. The CM also helps ensure uniformity of graphic user interface (GUI) and programmatic interfaces to the above communication devices. The CM helps anywhere anytime network connectivity and provides users the ability to move between various network environments.

Thus, for the illustrated embodiments, the mobile client device includes a mobile multi-radio platform that is made up of the MCD and wireless network card (NIC) 302 that plugs into the MCD as illustrated in FIG. 3. The MCD also includes an omnidirectional antenna 303 that receives signals from the wireless networks. As will be further described below, in addition to hosting multiple radios enabling the platform to access services across heterogeneous networks, the MCD is also endowed with teachings of the present invention to enable the MCD to seamlessly handover (HO) service across these heterogeneous wireless networks as the MCD moves through the geographical coverage area in order to allow for service continuity, especially for real-time services.

Generally, there are two types of network handovers (HO), specifically, horizontal and vertical. A horizontal HO is performed by switching between different points of attachment within the same accessed network (e.g., from one 802.11 AP to another 802.11 AP as defined in IEEE 802.11 or IEEE 802.11r Fast-roaming (working group)). Vertical HO is switching between different points of attachment across heterogeneous networks (e.g., WLAN to WiMAX). The MCD Media Independent Handover Function entity as defined in IEEE 802.21/D01.00 draft Standard (March, 2006) can discover and obtain network information existing within a geographical area for different wireless networks while receiving service from the wireless network to which it is actually connected. The network information may include, for example, network type, network ID, channel information, security information, and MAC addresses for APs and base stations.

The vertical HO decision-making process begins by discovering the available networks and selecting the most appropriate network. In a multi-radio platform, in order to optimize for power management, it may be beneficial for power saving purposes to only turn on a currently used radio and turn off all other radios. However, at any one time, one or more wireless networks may be more appropriate to use compared to the wireless network being currently used for various reasons. These reasons include better bandwidth/throughput available on other networks to fulfill the current applications requirements, better radio power consumption by operating on a different network, and better cost savings by using a specific network versus another network. Consequently, the mobile platform should be able to detect the available wireless networks in its geographical area in order for a specific network to be selected and the corresponding radio turned on.

In various embodiments, a media independent information service (MIIS) is provided by each of the wireless network service providers to form a framework within each of these wireless network service providers by which a media independent handover (MIH) function operates. The MIIS provide a framework and corresponding mechanisms by which the MIH function entity may discover and obtain network information existing within a geographical area to facilitate the handovers. The MIIS primarily provides a set of information elements (IEs), the information structure and its representation and a query/response type of mechanism for information transfer.

Figure 4:
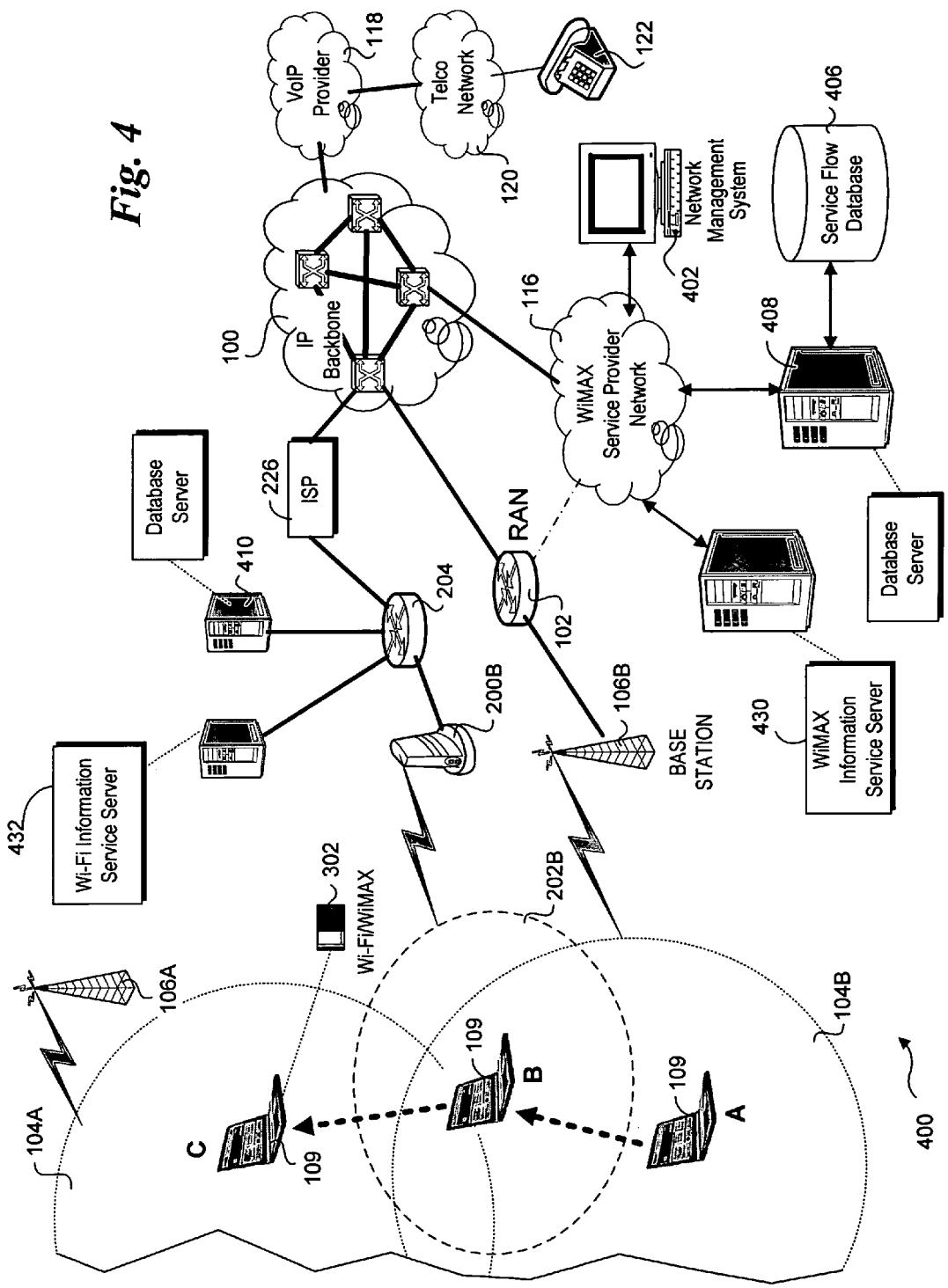
FIG. 4 is a schematic diagram illustrating some exemplary infrastructure for combination of the WiMAX and Wi-Fi networks of FIGS. 1 and 2, in accordance with various embodiments

FIG. 4 illustrates one example of a network infrastructure 400 including combined aspects of the WiMAX network of FIG. 1 and the Wi-Fi network of FIG. 2, in accordance with various embodiments of the present invention, wherein like-numbered components perform similar functions. The example includes a Network Management System (NMS) 402, and a Service Flow Database 406 hosted by a database server 408. The example also includes a database server 410 for management of the Wi-Fi network. The NMS 402 and Service Flow Database 406 are linked in communication to the WiMAX network's base stations via applicable network infrastructure, while database server 410 is linked in communication to the Wi-Fi network's Access Points via applicable network infrastructure, such as illustrated in FIG. 4. It is noted that other communication infrastructure also may also be employed. Each wireless network includes its own information service server (ISS) and thus, both the WiMAX and the Wi-Fi network include their own ISS 430, 432, respectively, which is connected to an internet protocol (IP) backbone network 100.

In various embodiments, the MIH function functions within both the mobile platform of the MCD and the ISS of each wireless network through the framework provided by the MIIS. The ISS is able to discover and obtain network information for its corresponding network, as well as other wireless networks within the same geographical area in order to facilitate seamless handover. This information gathering is done among the ISSs and enables different ISSs to access and collect service information available by other wireless networks in the same geographical area, depending upon business arrangements among the various wireless network providers. The MIIS supports different IEs to facilitate, among other things, horizontal and vertical handovers among networks. In various embodiments, the MIH function is also provided to each MCD endowed to practice embodiments of the present invention. The MIH function in the MCD is able to extract the IEs either from media specific broadcast information or by sending specific request/response primitives to the MCD's corresponding ISS of the network to which the MCD is connected.

Figure 5:
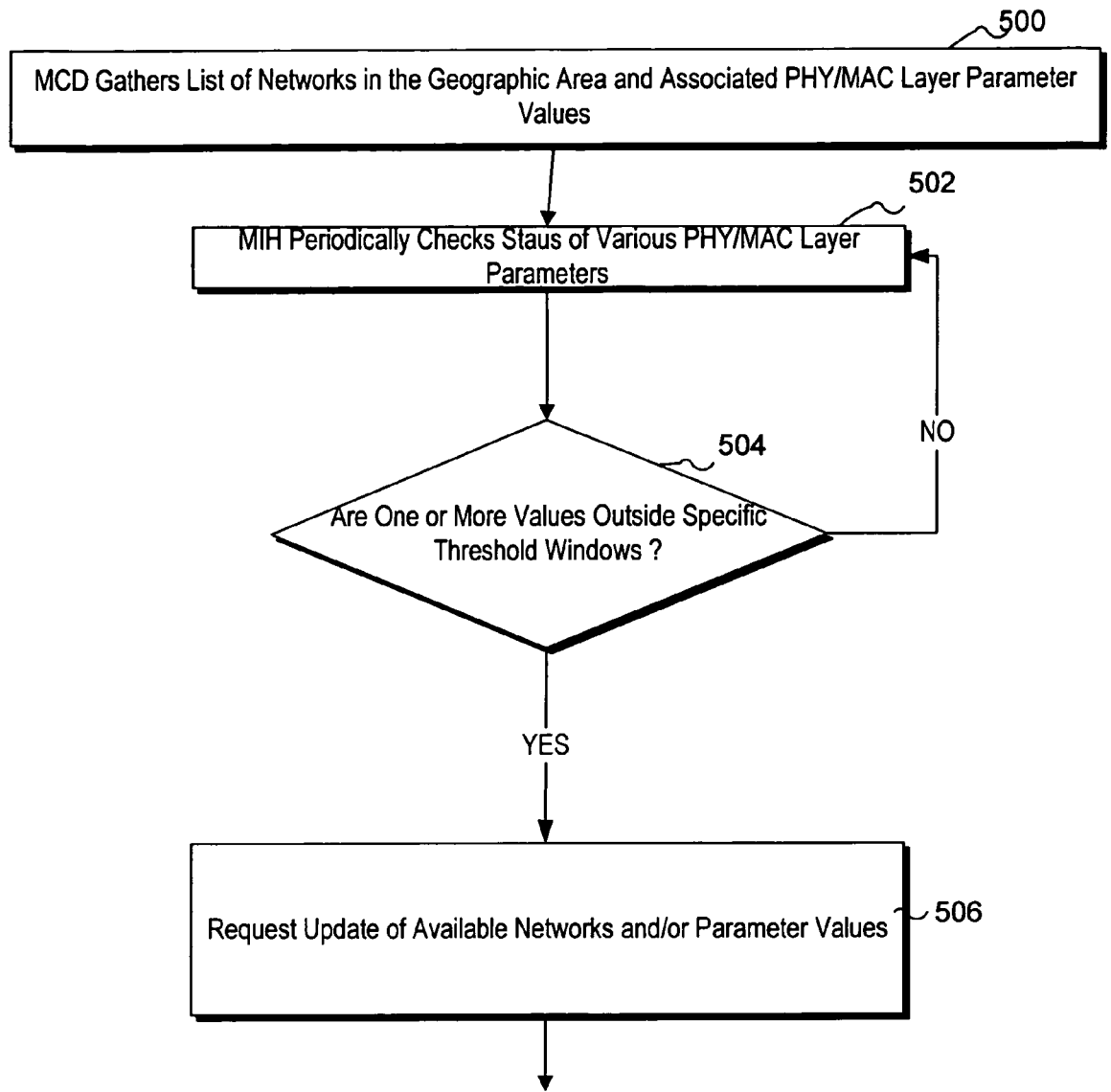
FIG. 5 is a flowchart illustrating operations and logic performed during a network detection/updating decision process in accordance with various embodiments of the present invention.

Referring to FIG. 5, in order to determine when to perform network discovery, it is initially assumed that the MCD is connected to at least one network from which it can either perform a global scan on all its radios or, through a connected network, query the network MIIS to gather a list of available networks in its geographical area as depicted in block 500. Generally, this is done by sending a request to the ISS of the network to which the MCD is connected to collect the list of available networks and their corresponding attributes within the MCD's geographical area. The MCD's geographical area may be known by having the MCD provide location information or other type of information such as Access Point/Base Station identification in order to "localize" to which network the client is connected. The MCD now has a list of available networks in its geographical area, as well as the networks' attributes, and will look to update this information at appropriate times considering that the MCD does not want to keep polling or asking for updates in order to reduce bandwidth utilization and power consumption. Table 1 provides an example of information the ISS may gather and provide to the MCD. In Table 1, GSM refers to Global System for Mobile Communications, SSID refers to Service Set Identifier, BSSID refers to Basic Service Set Identifier, PKM refers to Privacy Key Management, EAP refers to Extensible Authentication Protocol, PEAP refers to Protected EAP, and OFDM refers to Orthogonal Frequency-Division Multiplexing.

its network connection? Does the power consumption rapidly degrade and is there a need to conserve battery power and hence, should the MCD look for a network with a radio having better power consumption? Are the current network conditions adequate to support the client's requirements? Does the MCD require a minimum bandwidth in order to support ongoing applications? Collectively, these parameters are used to quantify the wireless service available based upon their numerical values. User policies may be used in quantifying the wireless service available.

Since the values of these parameters are constantly changing, particularly when the MCD is moving from one location to another, as depicted in blocks 504 and 506, if one or more of the parameter values fall outside specific threshold windows set by the user/operating system, the MIH function at the MCD may begin an optimization process for network discovery and/or updating of parameters since the MIH layer should have the latest information about available networks. Such a request generally involves requesting corresponding IEs for the various parameters. Fuzzy logic is an example of one way to implement the optimization process for use for network detection/updating.

In further detail, "fuzzy" logic is an extension of Boolean logic dealing with the concept of partial truth. Whereas classical logic holds that everything (statements) can be expressed in binary terms (0 or 1, black or white, yes or no), fuzzy logic replaces boolean truth values with degrees of truth. These statement representations are in fact nearer to real-life human problems and statements, as truth and results generally are partial (not binary) and/or imprecise (as in inaccurate, blurred, i.e., fuzzy). Fuzzy logic allows for set membership values between and including 0 and 1, shades of gray as well as black and white, and in its linguistic form, imprecise concepts like "slightly", "quite" and "very". Specifically, it allows partial membership in a set.

Fuzzy logic is often used in control systems and the like to generate control outputs based on a combined evaluation of multiple inputs that are quantified using associated fuzzy subsets (commonly referred to as "fuzzy sets"). Such uses include self-focusing cameras, washing machines, automobile engine controls, anti-lock braking systems, subway and elevator control systems, and computer trading programs. Fuzzy logic enables problems to be logically modeled, rather than using analog-based techniques employed by classical control system theory.

TABLE 1

| Network Type | SSID/Cell ID | BSSID | Operator | Security | EAP Type | Channel | QoS | PHY Layer | Data Rate |
|---|---|---|---|---|---|---|---|---|---|
| GSM | 13989 | N/A | AT&T ® | N/A | N/A | 1900 | N/A | N/A | 9.6 kbps |
| Wi-Fi | Intel ® | 00:00:... | Intel ® | .11i | EAP-PEAP | 6 | .11e | OFDM | 11 Mbps |
| WiMAX | N/A | N/A | T-Mobile ® | PKM | EAP-PEAP | 11 | Yes | OFDM | 40 Mbps |

In block 502, the MIH layer periodically checks the status of various client PHY/MAC layer parameters. These parameters may include, for example, a Receive Signal Strength Indicator (RSSI) value, Carrier-to-Interference Noise Ratio (CINR), power consumption, Packet Error Rate (PER), Bit Error Rate (BER), required bandwidth, and current network availability. For example, how is the RSSI behaving? In other words, is it getting weaker where the MCD may expect to lose Fuzzy logic usually uses IF/THEN rules, or constructs that are equivalent, such as fuzzy associative matrices. Rules are typically expressed in the form:

IF variable IS set THEN action

In one embodiment, the fuzzy sets are set according to the following example. One defines a fuzzy set STRONG using a membership function based on the MCD receiver RSSI:
$$\text{STRONG}(x) = \{0, \quad \text{if RSSI}(x) < -40 \text{ dBm},$$
$$(\text{RSSI}(x) + 40 \text{ dBm}), \quad \text{if } -40 \text{ dBm} < \text{RSSI}(x) \leq 0$$
$$1, \quad \text{if RSSI}(x) > 0\}$$

Thus, the degree that the RSSI received at an MCD is strong is defined by the fuzzy set STRONG.

Similarly, one defines a fuzzy set GOOD_Signal using a membership function based on the MCD receiver CINR:

$$\text{GOOD\_Signal}(x) = \{0, \quad \text{if CINR}(x) < 26.2 \text{ dB for 16-QAM } \sfrac{3}{4} \text{ modulation}$$
$$\text{CINR} - 26.2 \text{ dB}, \quad \text{if } 26.2 \text{ dB} < \text{CINR} \leq 40 \text{ dB for 16-QAM } \sfrac{3}{4} \text{ modulation}$$
$$1, \quad \text{if CINR}(x) > 40 \text{ dB for 16-QAM } \sfrac{3}{4} \text{ modulation}\}$$

Two fuzzy sets have been defined, namely STRONG and GOOD_Signal for the MCD receiver RSSI and CINR, respectively. A simple fuzzy rule can thus be written as follows:

$$A = X \text{ is STRONG and } X \text{ is GOOD\_Signal}$$

where the "and" statement is interpreted according to:

$$\text{truth}(x \text{ and } y) = \text{minimum}(\text{truth}(x), \text{truth}(y))$$

Other fuzzy sets can be easily defined for other input parameters in a similar manner, and additional fuzzy rules can be applied based on user profile and network availability.

Figure 6:
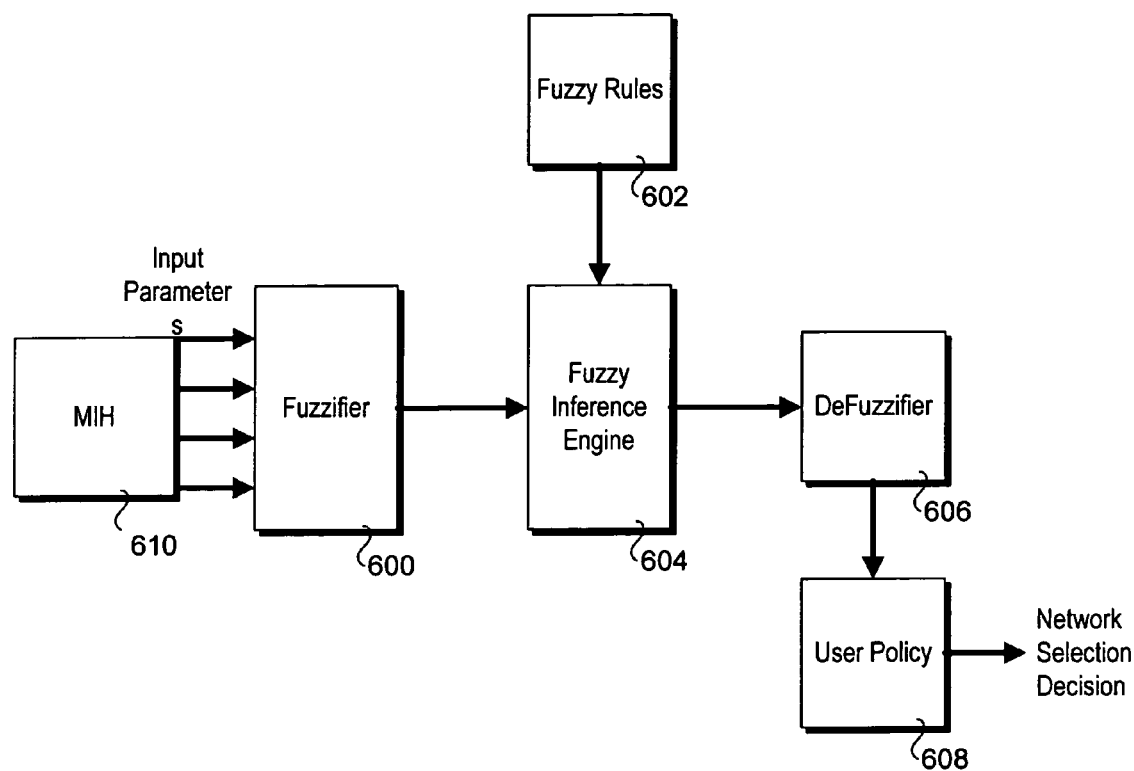
FIG. 6 is a block diagram of a fuzzy logic controller for use to practice various embodiments of the present invention.

FIG. 6 shows one embodiment of a fuzzy logic controller architecture for use in an MCD for network detection/updating decision, in accordance with various embodiments. The architecture consists of five building blocks: a Fuzzifier 600, Fuzzy Rules base 602, a Fuzzy Inference Engine (FIE) 604, a Defuzzifier 606, and user policy 608. The various parameters are applied as inputs to Fuzzifier 600 by MIH layer 610, where they are mapped into fuzzy sets. Each fuzzy set indicates the "goodness" of a corresponding parameter. These fuzzy sets are passed to FIE 604, where a set of fuzzy rules is applied to the inputs to determine if the network detection/updating should occur at this time. The Defuzzifier 606 compares two or more outcome values from FIE 604 using some type of an adaptive threshold operation to decide whether to initiate a handover at this time. In one embodiment, an adaptive threshold in Defuzzifier 606 adjusts the threshold level based on changes in the input parameters and past history to effect efficient network detection. If the answer is YES, then the MIH updates the MCD with available networks and network information.

Figure 7:
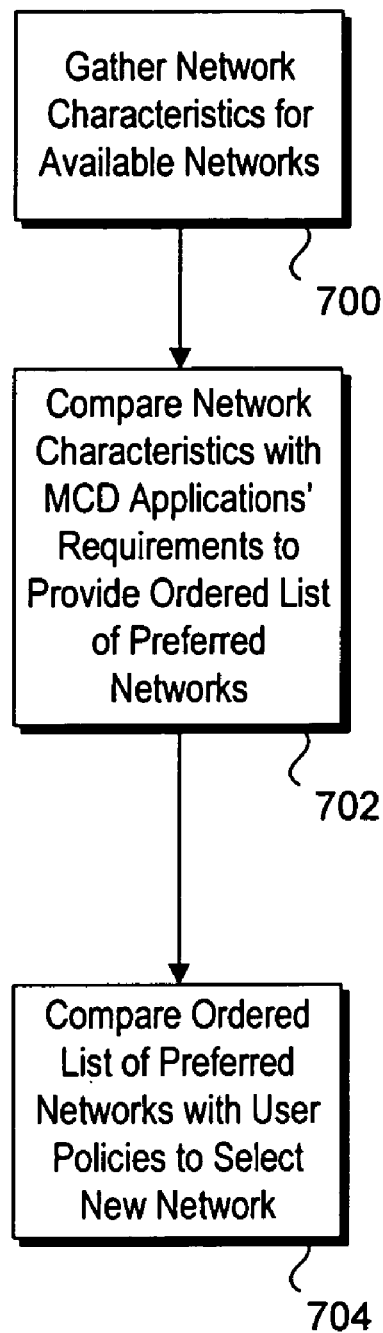
FIG. 7 is a flowchart illustrating general hierarchy for a network selection process in accordance with various embodiments of the present invention.

Later, if the MCD determines that a new network is desirable for handover of service, the list of available networks is then applied to the fuzzifier in order to apply a fuzzy set of rules to select the most appropriate networks. The input parameters at this time are based upon network characteristics, i.e., the specific capability of each network in terms of available bandwidth, expected latency, capacity, etc. The fuzzy rules are applied to the fuzzy inference engine and the results are defuzzified. The output is now an ordered list of preferred networks. The ordered list of preferred networks is applied to the user policy decision engine where policy rules are defined in a user profile in order to specify how a specific network should be selected. For example, the decision to select a WiMAX or a WLAN network may be based on various user policy rules such as a monthly fee or a one time usage fee, network coverage in the user location, security requirements, Quality of Service (QoS) support, etc. FIG. 7 summarizes an example of the general hierarchy for a network selection process in accordance with the present invention. Network characteristics are gathered for each available network in the geographic area in block 700. The characteristics are compared with various MCD applications' requirements in block 702 to provide an ordered list of preferred networks. In block 704, the ordered list of preferred networks is compared to user policies to select a network of handover of service.

Figure 8:
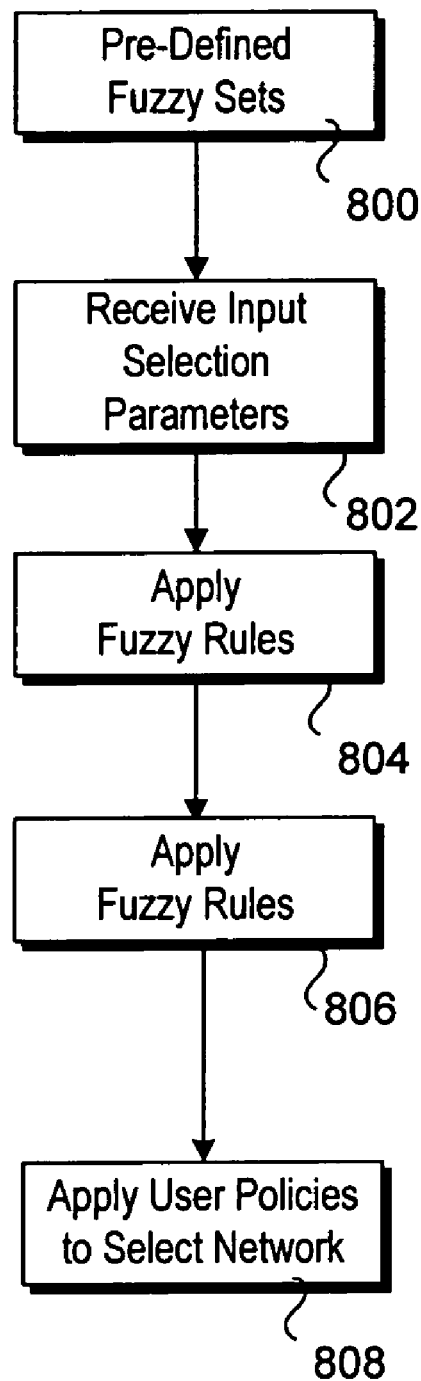
FIG. 8 is a flowchart illustrating operations and logic performed during a network selection decision process in accordance with various embodiments of the present invention.

FIG. 8 shows, for example, operations and logic for a network selection process that may be implemented using the fuzzy logic controller of FIG. 6. During an initialization operation or the like, pre-defined fuzzy sets are loaded into the controller in the MCD, as depicted in block 800. In block 802, the MCD performs real-time acquisition of the relevant network selection parameters used to quantify the available wireless networks, such as RSSI, QoS, network availability, etc., which are mapped into the pre-defined fuzzy sets. Then, in block 804, the fuzzy logic controller applies the fuzzy rules. Block 606 provides an ordered list of preferred networks. Block 808 applies the user policies to select a network for handover of service.

Figure 9:
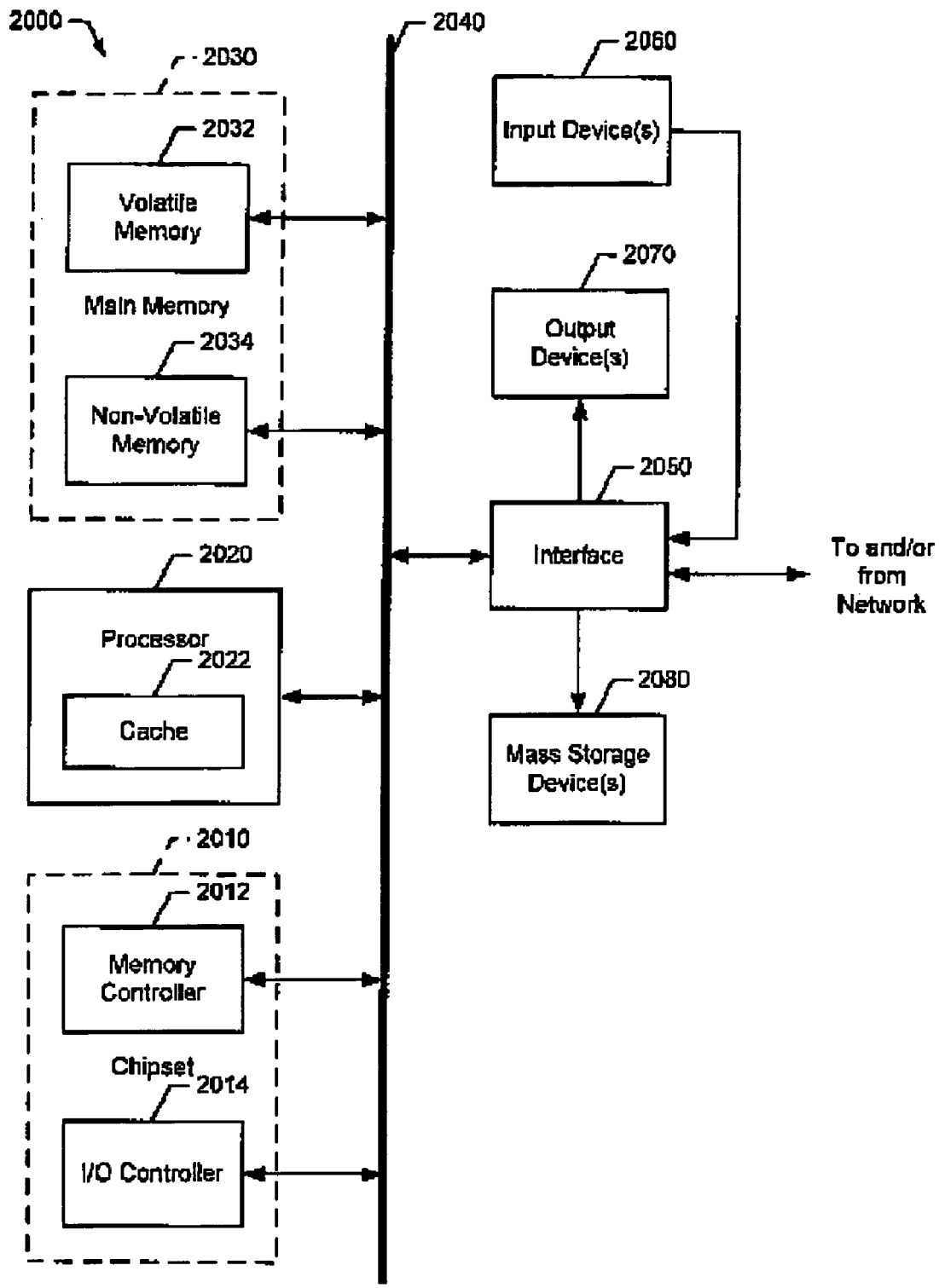
FIG. 9 is a block diagram representation of an example processor system that may be used to practice various aspects of the present invention.

FIG. 9 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, and/or any other type of computing device.

The processor system 2000 illustrated in FIG. 9 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 9 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for wireless network discovery and selection, the method comprising:

obtaining periodically a plurality of parameter values for a plurality of parameters of one or more network layers on a mobile client device, associated with accessing a plurality of heterogeneous wireless networks;

determining whether to request update(s) for one or more of the heterogeneous wireless networks, based at least in part on the obtained parameter values;

requesting an update for each of the heterogeneous wireless networks determined to have an update requested; and selecting a first of the heterogeneous wireless networks for the mobile client device to access, based at least in part upon the updates received for the heterogeneous wireless networks, thereby replacing a second of the heterogeneous wireless networks currently accessed by the mobile client device;

wherein the obtaining periodically a plurality of parameter values is for a plurality of Physical Layer (PHY) and/or Media Access Control (MAC) layer parameters of the client device; and wherein the PHY and/or MAC layer parameters comprise two or more selected from a group comprised of a received signal strength parameter, a power consumption parameter, a required bandwidth parameter, and a network availability parameter.

2. The method of claim 1, wherein the mobile client device comprises a multi-radio platform to access the parameters of one or more heterogeneous wireless networks within a geographical area.

3. The method of claim 1, wherein the plurality of heterogeneous wireless networks comprise two or more selected from a group comprised of a Wireless Fidelity (Wi-Fi) wireless network, a Worldwide Interoperability for Microwave Access (WiMax) wireless network and a Third Generation (3G) cellular network.

4. The method of claim 1, wherein the determining whether to request for update(s) comprises inputting the parameter values into a fuzzy logic controller adapted to perform the determining based upon the inputted parameter values.

5. The method of claim 1, wherein the determining whether to request for update(s) comprises fuzzifying the parameter values into a plurality of fuzzy sets, applying a plurality of fuzzy rules to the fuzzy sets, and deciding whether to request update(s) for the heterogeneous wireless networks based at least in part upon the results derived from applying the plurality of fuzzy rules to the fuzzy sets.

6. The method of claim 1, wherein the selecting a first of the heterogeneous wireless networks comprises inputting the updates to a fuzzy logic controller adapted to perform the selecting based upon the inputted updates.

7. The method of claim 1, wherein the selecting a first of the heterogeneous wireless networks comprises fuzzifying the updates into a plurality of fuzzy sets, applying a plurality of user policies to the fuzzy sets, and selecting the first of the heterogeneous wireless networks based at least in part upon the results derived from the applying.

8. An apparatus comprising:
a fuzzy logic controller; and a media independent handover function block coupled to the fuzzy logic controller, the media independent handover function block being adapted to obtain periodically a plurality of parameter values of a plurality of network layer parameters of the apparatus, associated with accessing a plurality of heterogeneous wireless networks, and to input the obtained parameter values to the fuzzy logic controller to generate a determination on whether to request for update(s) for the plurality of heterogeneous wireless networks;

wherein the media independent function block is adapted to obtain periodically a plurality of parameter values for a plurality of PHY and/or MAC layer parameters of a mobile client device; and wherein the PHY and/or MAC layer parameters comprise two or more layer parameters selected from a group comprised of a received signal strength parameter, a power consumption parameter, a required bandwidth parameter, a network availability parameter;

wherein the media independent handover function block is further adapted to input the updates to the fuzzy logic controller to select a first of the heterogeneous wireless networks for a mobile client device to access, replacing a second of the heterogeneous wireless networks currently accessed by the mobile client device.

9. The apparatus of claim 8, wherein the fuzzy controller comprises a set of fuzzy rules.

10. The apparatus of claim 8, wherein the fuzzy logic controller selects the first of the heterogeneous wireless networks by applying a plurality of user policies to the fuzzy sets.

11. An article of manufacture utilizing the computer readable programming instructions to perform the fuzzy logic comprising:

a storage medium; and a plurality of programming instructions stored within the storage medium and designed to enable a controller to fuzzify obtained updates comprising parameter values of a plurality of heterogeneous wireless networks into a plurality of fuzzy sets, and to apply a plurality of user policies to the fuzzy sets to select a first of the heterogeneous wireless networks for a mobile client device hosting the article of manufacture to access, replacing a second of the heterogeneous wireless networks accessed by the mobile client device;

wherein the network layer parameters are for a plurality of PHY and/or MAC layer parameters of the mobile client device; and wherein the PHY and/or MAC layer parameters comprise two or more selected from a group comprised of a received signal strength parameter, a power consumption parameter, a required bandwidth parameter, and a network availability parameter.

12. The article of claim 11, wherein the programming instructions are further designed to enable the controller to fuzzify obtained parameter values of a plurality of network layer parameters of the mobile client device into a plurality of fuzzy sets, and apply a plurality of fuzzy rules to the fuzzy sets to determine whether to request update(s) for one or more of the heterogeneous wireless networks.

13. The article of claim 11, wherein the mobile client device comprises a multi-radio platform to access the parameters of one or more heterogeneous wireless networks within a geographical area.

* * * * *

UNITED STATES PATENT AND TRADEMARK OFFICE
CERTIFICATE OF CORRECTION

PATENT NO. : 7,653,392 B2 Page 1 of 1
APPLICATION NO. : 11/412479
DATED : January 26, 2010
INVENTOR(S) : Ovadia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Twenty-third Day of November, 2010

David J. Kappos
*Director of the United States Patent and Trademark Office*